2,767,048

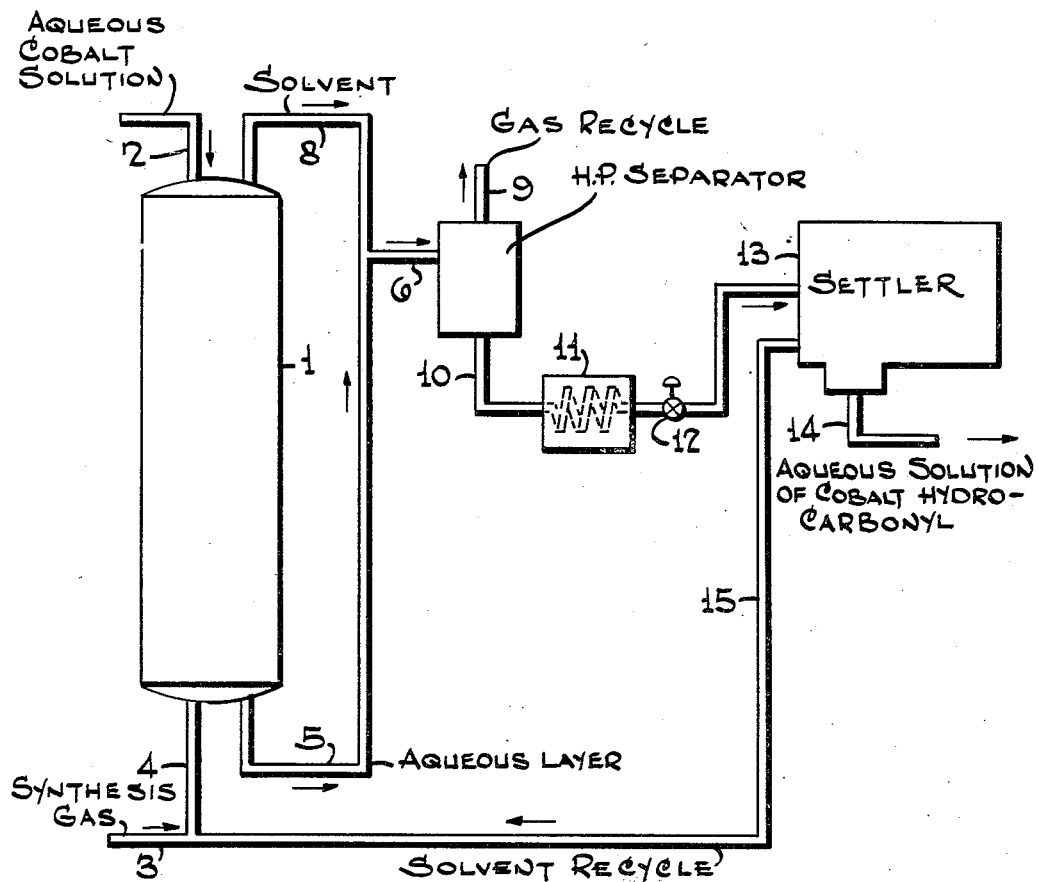
Continuous Production of Aqueous Solutions of Cobalt Hydrocarbonyl
Joseph K. Mertzweiller Inventor
By Henry Berk Attorney

PREPARATION OF METALLIC HYDROCARBONYLS

Joseph K. Mertzweiller, Baton Rouge, La., assignor to Esso Research and Engineering Company, a corporation of Delaware Application September 7, 1951, Serial No. 245,599

5 Claims. (Cl. 23—50)

This invention relates to a novel process for the preparation of metallic hydrocarbonyls and their salts.

The metallic hydrocarbonyls (carbonyl hydrides) and their salts are of potential importance as catalysts for many synthesis processes. An outstanding example is the oxo or hydroformylation reaction in which aldehydes and alcohols are obtained by treating olefins with carbon monoxide and hydrogen in the presence of a cobalt catalyst. While many forms of cobalt may be utilized, it is considered by most investigators that these are converted to cobalt hydrocarbonyl under synthesis conditions, and that this compound functions as the actual hydroformylation catalyst.

It is thus apparent that it would be advantageous to have a source of this compound.

While several preparations of cobalt hydrocarbonyl are described in the literature, most of these are rather inconvenient and many require the isolation of cobalt carbonyl as an intermediate.

This invention provides a simple and novel process for preparation of aqueous solutions of metallic hydrocarbonyls and their salts, and particularly cobalt hydrocarbonyl $HCo(CO)_4$. The process comprises treating an aqueous solution of a cobalt salt of an organic or inorganic acid with carbon monoxide and hydrogen at elevated pressures and temperatures. It is also necessary that the treatment be carried out in the presence of a suitable organic solvent to obtain appreciable yields of cobalt hydrocarbonyl. Apparently the conversion of the cobalt salt to the desired product takes place in the organic solvent and is then simultaneously extracted by the aqueous phase. The latter upon separation from the organic solvent gives the desired product in aqueous solutions.

The cobalt salts that can be utilized in the process of this invention comprise organic and inorganic salts of cobalt, including such salts as cobalt acetate or cobalt formate. The salts are utilized preferably in aqueous concentrations in the range of about 2–5 wt. percent cobalt.

The organic solvents utilized in the process of this invention have the following characteristics: insolubility in water, and inertness under the reaction conditions. In general the inert oxygenated solvents are most desirable, but saturated or aromatic hydrocarbons can also be employed. Solvent is generally in the range of 10–100% on aqueous solution.

The best solvents consist of inert oxygenated solvents, especially the primary aliphatic alcohols or aldehydes having 4 or more carbon atoms per molecule. Crude mixtures of primary aliphatic aldehydes or alcohols such as are obtained by decobalting oxo products or by hydrogenation of the products of the hydroformylation reaction also function as efficient solvents. Iso-octyl aldehyde is an especially good solvent. As stated above, the conversion of the cobalt salt starting material to the cobalt carbonyl hydride takes place in the organic solvent and then the anion is selectively extracted by the aqueous phase, giving cobalt hydrocarbonyl or its cobalt salt.

The reaction temperature is maintained in the range of 90° to 180° C. with a pressure of 1,000 to 4,000 p. s. i. g. Preferable contact times range from ½ to 6 hours. Synthesis gas is employed in considerable stoichiometric excess (generally 10–100 fold) with respect to cobalt. Hydrogen to carbon monoxide ratios are generally in the range of 1/1, although 0.5–4.0/1 may be used.

This invention will be better understood by reference to the flow diagram shown in the drawing.

In the system shown the aqueous cobalt salt solution enters reactor 1 through line 2. Hydrogen and carbon monoxide enter reactor 1 through lines 3 and 4. A countercurrent contacting is thereby effected. Intimate mixing is carried out in reaction zone 1. The aqueous layer withdrawn from reaction zone 1 through line 5 contains cobalt hydrocarbonyl as well as unconverted cobalt salts and is sent through line 6 into high pressure separator 7. The organic solvent is withdrawn from reaction zone 1 through lines 8 and 6 to high pressure separator 7. Unconverted carbon monoxide and hydrogen are withdrawn from high pressure separator 7 maintained at approximately the same pressure and temperature range as reactor 1 through line 9. The combined liquid mixture of aqueous and organic liquids is withdrawn through line 10 through cooling coil 11 and automatic pressure reducer 12 to settler 13. In settler 13 the two phases are separated into an upper organic phase and a lower aqueous phase. The lower aqueous phase, comprising the aqueous solution of cobalt hydrocarbonyl with unconverted cobalt salts which do not interfere with the efficacy of the former, is withdrawn through line 14. The organic solvent is withdrawn through line 15 and can be recycled through line 4 to reactor 1.

The following examples further illustrate the details of this invention and highlight its advantages.

*Example I.—Synthesis in the absence of solvents*

An aqueous solution containing 3.27 wt. percent cobalt present as cobaltous acetate and about 1% free acetic acid was contacted with a mixture of carbon monoxide and hydrogen ($H_2/CO$ ratio about 1.1/1) in a stainless steel shaker autoclave at a temperature of about 107° C. and pressures in the range of 2500–3300 p. s. i. g. Liquid samples were withdrawn at intervals during the treating operation and analyzed for total free acid and cobalt as cobaltous ions. Results are as follows:

|  | Feed | Product | | | |
|---|---|---|---|---|---|
|  |  | Hour 1 | Hour 3 | Hour 6 | Hour 12 |
| Acidity, Wt. Percent as HAc | 0.93 | 0.98 | 1.01 | 1.03 | 1.16 |
| Cobalt (as $Co^{++}$) | 3.27 | 3.27 | 3.18 | 3.19 | 3.18 |
| Cobalt (as hydrocarbonyl) |  | nil | trace | trace | trace |

The products from hour 3 on contained small traces of cobalt hydrocarbonyl as evidenced by the formation of small traces of yellow precipitate (cobalt carbonyl) when the solutions were exposed to air. The concentrations of cobalt hydrocarbonyl were too small to be analyzed directly, but it is estimated by the differences in $Co^{++}$ concentrations between the feed and products that not more than 3% of the cobalt was converted and this conversion was achieved at the end of three hours and did not increase when the treatment was continued for a total of twelve hours. This example illustrates the necessity of utilizing the indicated types of organic solvents in the process as shown in Example II.

*Example II*

Synthesis in the presence of solvents is illustrated by the following. All treatments were for six hours with hydrogen/CO ratio about 1.1/1.

| Feed | Aqueous Cobaltous Acetate | | | | Aqueous Cobaltous Acetate | | | |
| --- | --- | --- | --- | --- | --- | --- | --- | --- |
| Cobalt Conc., Wt. Percent | 3.43 | 3.43 | 3.43 | 3.43 | 3.27 | 3.27 | 3.27 | 3.27. |
| Free Acid | Acetic | Acetic | Acetic | Acetic | Acetic | Acetic | Acetic | Acetic |
| Conc., Wt. Percent | 1.1 | 1.1 | 1.1 | 1.1 | 1.1 | 1.1 | 0.93 | 0.93. |
| Solvent | Iso-Octyl Aldehyde. | Iso-Octyl Aldehyde. | Iso-Octyl Aldehyde. | Iso-Octyl Aldehyde. | Iso-Octyl Alcohol. | Iso-Octyl Alcohol. | Hydro. Product. | Fract. Btms. |
| Solvent/Water, Vol. Ratio | 1/1 | 1/1 | 1/1 | 1/1 | 1/1 | 1/1 | 1/1 | 1/1. |
| Temperature, °C | 79 | 107 | 149 | 177 | 107 | 177 | 107 | 107. |
| Pressure, p. s. i. g. (At Start) | 3,150 | 3,000 | 2,900 | 3,200 | 2,900 | 3,000 | 2,925 | 2,900. |
| Cobalt Distribution, Wt. Percent of Cobalt Charged: | | | | | | | | |
| In Solvent | 1 | 6 | 29 | 41 | 52 | 48 | 45 | 1. |
| In Water as Co++ | 102 | 45 | 31 | 25 | 15 | 16 | 16 | 99. |
| In Water as [Co(CO)4]-ion | nil | 44 | 39 | 28 | 21 | 19 | 28 | Trace. |
| Cobalt, Accounted For, Wt. Percent of Charge | 102 | 95 | 99 | 94 | 88 | 83 | 89 | 99. |
| Concentration of Hydrocarbonyl anion in Water, Wt. Percent | | 4.33 | 4.03 | 2.97 | 2.28 | 2.14 | 2.70 | |

It is indicated by these data that the choice of solvent is important. For example, iso-octyl aldehyde gives the maximum concentration of cobalt hydrocarbonyl at 107° C., while iso-octyl alcohol (finished product) gives less hydrocarbonyl at 107° C. and proportionately more cobalt in the solvent. The crude hydro product was intermediate while fractionator bottoms (bottoms from distillation of hydro product containing unsaturated organic compounds) was very ineffective, giving results about equivalent to those obtained in the absence of solvents.

The obtaining of the cobalt hydrocarbonyl cobalt salt in aqueous solutions is a distinct advantage, as it is stable in water at atmospheric temperatures and pressures and also elevated temperatures and pressures. This type of product is obtained by allowing the conversion to proceed to such an extent that there remains in the aqueous phase a stoichiometric equivalent or an excess of the $Co^{++}$ ion with respect to the $Co(CO)_4^-$ ion. If necessary this relationship may be achieved by adding a source of $Co^{++}$ to the reaction product. The unique stability of the cobalt salt is illustrated by the following example:

*Example III*

An aqueous solution similar to the above described solution showed the following composition:

| | |
| --- | --- |
| Sp. gr. (78° F.) | 1.0736 |
| Total acid (wt. percent) as acetic acid | 0.79 |
| Cobalt, wt. percent as $Co^{++}$ | 2.39 |
| Cobalt, wt. percent as $Co(CO)_4^-$ | 1.52 |

315 cc. of this solution was concentrated by distilling off water at atmospheric pressure until the residue amounted to 218 cc. This represents a volume decrease of 30.8%. The residue was analyzed and had the following composition:

| | |
| --- | --- |
| Sp. gr. (78° F.) | 1.108 |
| Total acid (wt. percent as HAc) | 0.64 |
| Cobalt, wt. percent as $Co^{++}$ | 3.12 |
| Cobalt, wt. percent as $Co(CO)_4^-$ | 2.00 |

These data show that the cobalt constituents increased in concentration in proportion to the decrease in volume of the solution, there being little or no loss in hydrocarbonyl anion.

If desired, pure cobalt carbonyl can be obtained by treating the aqueous solutions with air under acidic conditions.

Another method of conducting the process of this invention is by treating the cobalt salt with the indicated gaseous mixture in an organic solvent exclusively, giving largely the cobalt carbonyl hydride $HCo(CO)_4$. Extraction with an aqueous solution results in the obtaining of the cobalt hydrocarbonyl salt.

This process is applicable to other metals which form hydrocarbonyls under similar conditions as cobalt such as iron.

The analytical method used to determine the $Co^{++}$ and $Co(CO)_4^-$ in the aqueous solutions is as follows.

The total acidity and $Co^{++}$ in the original solution are determined by potentiometric titration with NaOH in an inert atmosphere. Then another sample in which the $Co(CO)_4^-$ has been oxidized to $Co^{++}$ by treatment with $H_2O_2$ or $HNO_3$ is titrated to determine total cobalt (now all present as $Co^{++}$). The $Co(CO)_4^-$ is the difference between the total cobalt and the original $Co^{++}$.

It is to be understood that the invention is not limited to the specific examples, which have been offered merely as illustrations, and that modifications may be made in equipment and conditions within the range specified without departing from the spirit of the invention.

What is claimed is:

1. The process of preparing and separating an aqueous solution of a cobaltous salt of cobalt hydrocarbonyl suitable for catalyzing a reaction of an olefinic carbon compound with carbon monoxide and hydrogen which comprises initially treating an aqueous solution of an organic cobalt salt which supplies $Co^{++}$ ions with a gaseous mixture of hydrogen and carbon monoxide in the presence of an inert oxygenated organic solvent therefor, prior to contacting said solution with organic reactants at a temperature between about 90° and 180° C. under an elevated pressure, maintaining the organic cobalt salt in the resulting liquid reaction mixture in such quantity that it provides cobaltous ions at least in sufficient amounts to combine with all $Co(CO_4)^-$ ions present in the aqueous phase to form the cobalt salt of cobalt hydrocarbonyl, discharging unconverted gases from the resulting reaction mixture, separating the residual liquid reaction mixture into an organic liquid phase and an aqueous liquid phase containing the cobaltous salt of cobalt hydrocarbonyl.

2. A process as in claim 1, in which the inert oxygenated organic solvent is selected from the class consisting of aldehydes and alcohols having at least 4 carbon atoms per molecule.

3. The process as in claim 1, in which the elevated pressure maintained on said reaction mixture is 1000 to 4000 p. s. i. g.

4. The process as in claim 1, in which the organic liquid phase separated from the residual reaction mixture is reused in treating more of said aqueous solution of the organic cobalt salt.

5. A process of preparing and separating an aqueous solution of cobaltous salt of cobalt hydrocarbonyl suitable for catalyzing the reaction of an olefinic carbon compound, carbon monoxide and hydrogen, which comprises initially treating an aqueous solution of cobaltous acetate which supplies $Co^{++}$ ions with a gaseous mixture of hydrogen and carbon monoxide in the presence of iso-octyl aldehyde, prior to contacting said solution with an olefinic carbon compound, at a temperature between about 90° and 180° C. and a pressure of 1000 to 4000 p. s. i. g., maintaining the cobaltous acetate in the reaction mixture in amounts such that it provides the $Co^{++}$ ions at least in sufficient amounts to combine with all $Co(CO_4)^-$ ions present in the aqueous phase, discharging unconverted gases from the resulting reaction mixture, separating the resulting liquid reaction mixture into an aldehyde phase and an aqueous phase containing the cobaltous salt of cobalt hydrocarbonyl, and withdrawing the aqueous phase containing the cobalt salt of cobalt hydrocarbonyl.

References Cited in the file of this patent

UNITED STATES PATENTS

| | | |
|---|---|---|
| 2,088,997 | Max | Aug. 3, 1937 |
| 2,473,993 | Gresham | June 21, 1949 |
| 2,477,554 | McKeever | July 26, 1949 |
| 2,647,149 | Condit et al. | July 28, 1953 |

OTHER REFERENCES

Blanchard: "Chemical Reviews," vol. 21, No. 1, pages 18–19 (August 1937).